United States Patent [19]
Bierwirth et al.

[11] Patent Number: 5,094,800
[45] Date of Patent: Mar. 10, 1992

[54] PRESS FOR COMPRESSING ELONGATED RADIOACTIVE STRUCTURAL ELEMENTS

[75] Inventors: Helmut Bierwirth; Thomas König, both of Kassel; Burkhardt Schulte, Minden, all of Fed. Rep. of Germany

[73] Assignees: Thyssen Industrie AG, Essen; Deutsche Gesellschaft für Wiederaufarbeitung von Kernbrennstoffen mbH, Hanover, both of Fed. Rep. of Germany

[21] Appl. No.: 412,667

[22] Filed: Sep. 26, 1989

[30] Foreign Application Priority Data

Oct. 8, 1988 [DE] Fed. Rep. of Germany ....... 3834269

[51] Int. Cl.$^5$ .............................................. G21F 9/36
[52] U.S. Cl. ...................................... 376/260; 100/248
[58] Field of Search ................ 376/260, 261; 252/626, 252/633; 100/247, 248, 218

[56] References Cited

U.S. PATENT DOCUMENTS

| | | | |
|---|---|---|---|
| 135,291 | 1/1873 | Shearer | 100/248 |
| 4,511,499 | 4/1985 | Meuschke et al. | 376/261 |
| 4,537,711 | 8/1985 | Wilhelm et al. | 376/260 |
| 4,648,989 | 3/1987 | Klein | 376/261 |
| 4,650,606 | 3/1987 | Yamamoto | 376/261 |
| 4,923,668 | 5/1990 | Lahr et al. | 376/261 |
| 4,944,911 | 7/1990 | Beneck et al. | 376/261 |

FOREIGN PATENT DOCUMENTS

| | | | |
|---|---|---|---|
| 93195 | 8/1897 | Fed. Rep. of Germany | 100/247 |
| 3300359 | 7/1984 | Fed. Rep. of Germany | |
| 3444570 | 6/1985 | Fed. Rep. of Germany | |
| 3802966 | 4/1989 | Fed. Rep. of Germany | |

Primary Examiner—Daniel D. Wasil
Attorney, Agent, or Firm—Robert W. Becker & Associates

[57] ABSTRACT

A press for compressing elongated radioactive structural elements, with the press having a horizontal press shaft and a removable counterpunch in place of which a transfer shaft can receive a finished pressed object. The press is remotely operable, has a minimum overall length, and assures that during compression as well as insertion of the pressed object into the transfer shaft, no small particles can escape from the press line and that the unavoidable swelling of the pressed object in the axial direction has no impact upon removal of the counterpunch and insertion of the pressed object into the transfer shaft. The press ram includes several insertable press ram sections, and the cover is divided into several cover portions. The horizontal press shaft is movably disposed in the pressing direction on a mounting base between two crosspieces interconnected by tie rods. Via a displacement drive, the press shaft is brought to rest against the counterpunch for the compression process, and against the transfer shaft for the ejection process. To insert the counterpunch and remove a loaded transfer shaft, the press shaft is retracted far enough to provide a free space.

8 Claims, 4 Drawing Sheets

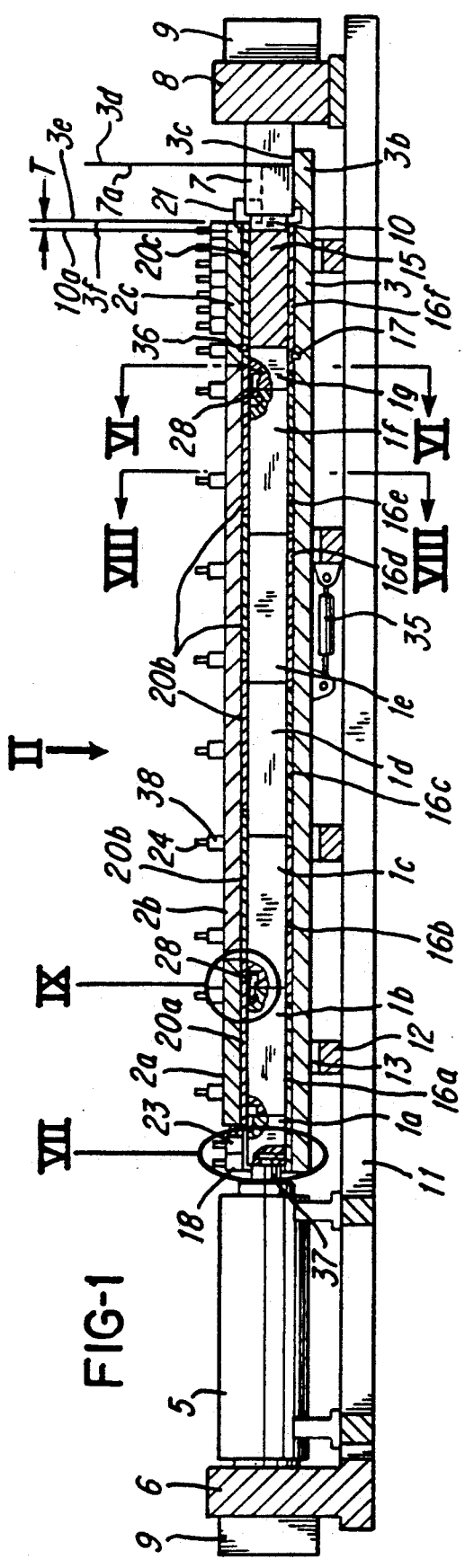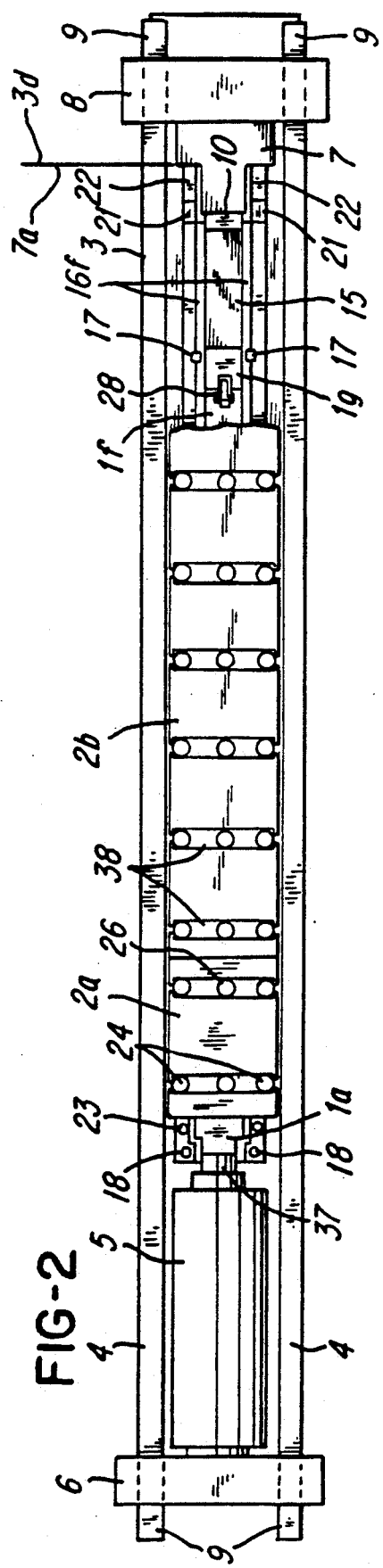

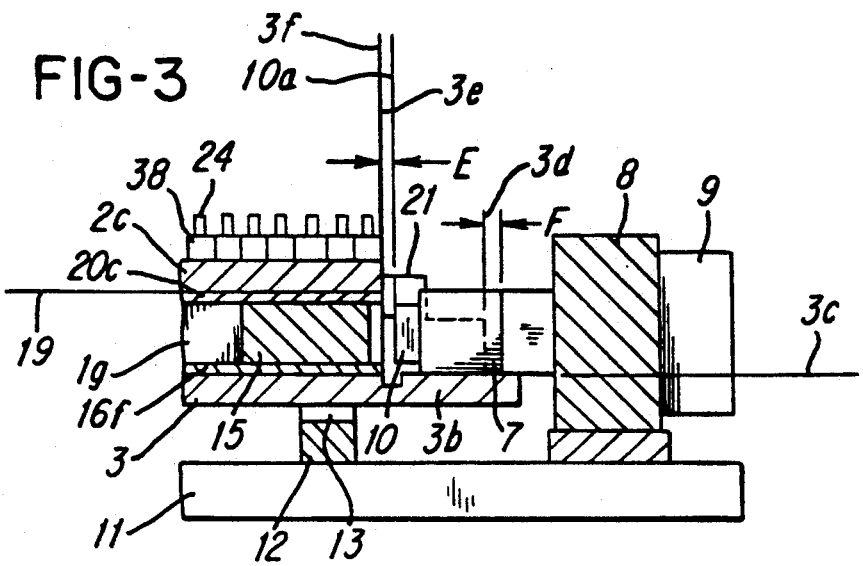
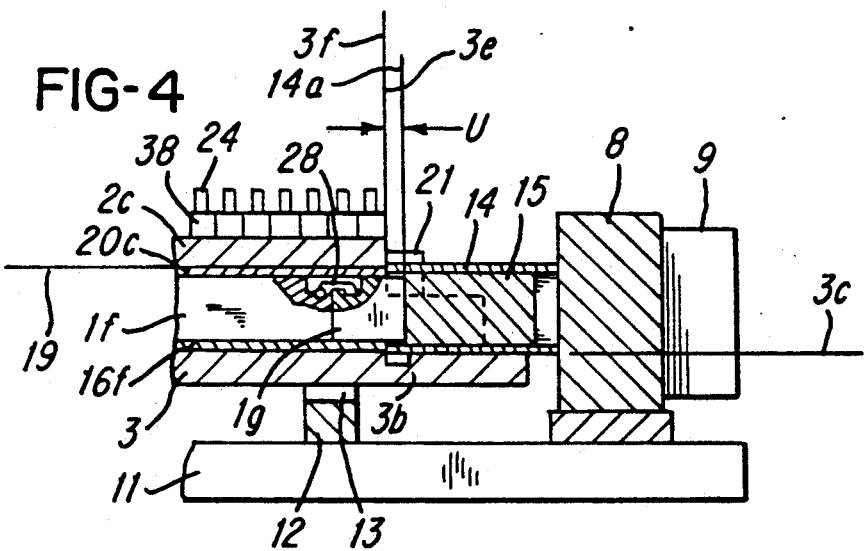
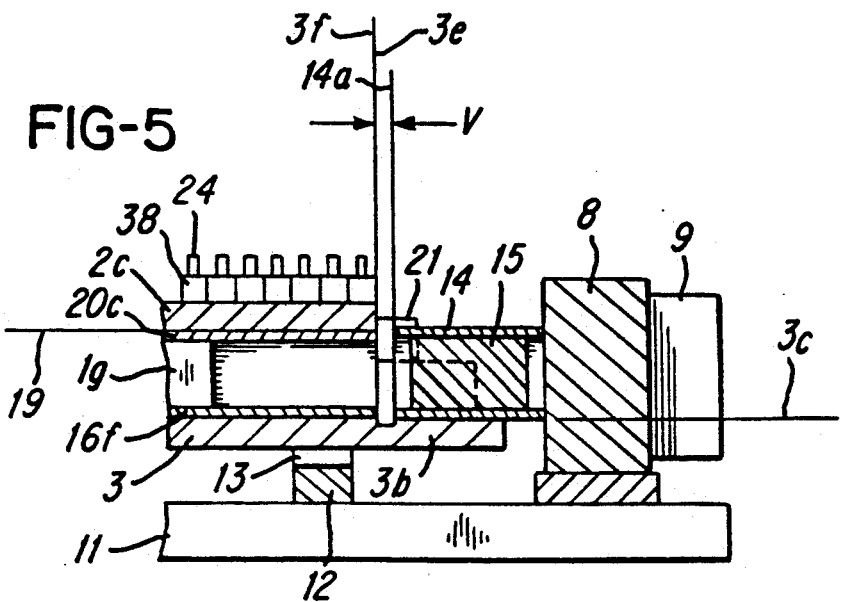

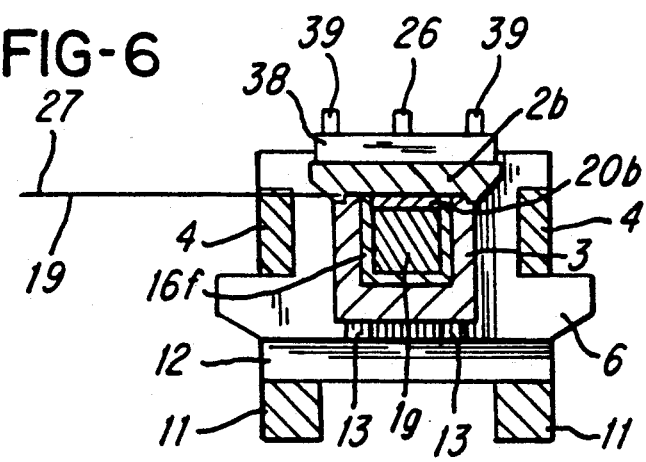
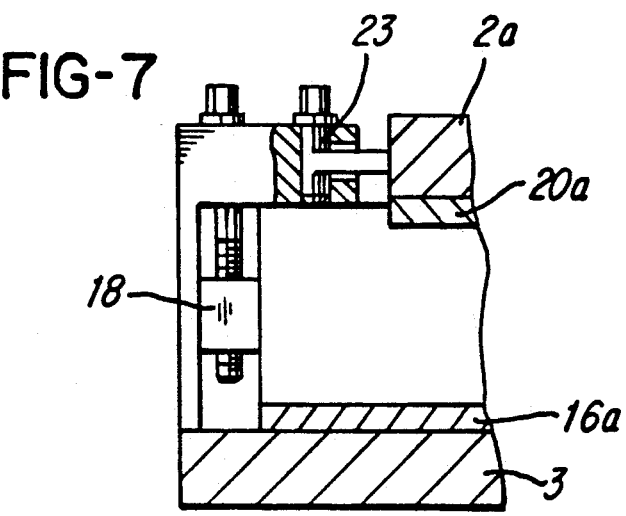
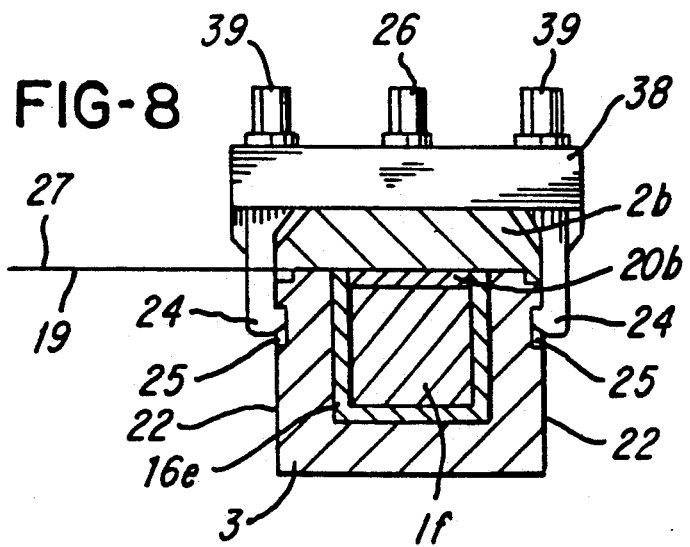

PRESS FOR COMPRESSING ELONGATED RADIOACTIVE STRUCTURAL ELEMENTS

BACKGROUND OF THE INVENTION

The present invention relates to a press for compacting or compressing elongated radioactive structural elements, such as fuel cell skeletons, including a horizontally disposed press line that comprises a press shaft provided with a cover, a press ram operated via a hydraulic cylinder, and a removable counterpunch in place of which, after a compressing process has been completed, is inserted a transfer shaft into which is introduced the highly compressed pressed object via further advancement of the press ram. The present invention also relates to a method for operating such a press.

A press of this general type was disclosed in German Offenlegungsschrift 38 02 966. The press ram thereof is driven by a long hydraulic cylinder. Via the press ram, a fuel cell or element skeleton is compressed in the longitudinal direction against the base of the press shaft. After the compression, the pressed object is pushed into a transfer shaft with which it is conveyed out of the press. The transfer shaft extends about the pressed object, so that broken pieces of skeleton remain secured, and an expansion of the volume in the radial direction due to expansion of the pressed object is prevented. The ability to keep the pressed object within certain dimensions is advantageous for further operating stages.

Due to the necessary long hydraulic cylinder, a drawback of this proven press is its great structural length, which also makes a remote handling more difficult. It was furthermore discovered that toward the end of the compressing process, smaller particles can escape from the press line out of the gaps that necessarily result between the end face of the press body and the end face of the counterpunch during assembly. Due to the resilience of the pressed object after conclusion of the compression process, the pressed object can swell in the axial direction and thereby prevent removal of the counterpunch.

German Offenlegungsschrift 34 44 570 proposes an apparatus with which elongated radioactive parts that have the same geometry are cut into pieces and are subsequently introduced into a receptacle. The length of these pieces corresponds approximately to the height of the receptacle.

By means of a packing mechanism, pieces that are already in the receptacle are pressed to the side in order to provide space for further pieces. This mechanism is designed for pieces having a very specific geometry; it is not suitable for compacting or compressing elongated radioactive parts having varying geometries, such as non cut-up fuel cell skeletons.

German Offenlegungsschrift 33 00 359 furthermore proposes an ejection mechanism for compactable material, where the material, which is in pieces or is granular, is compressed into plugs in a compression chamber. In so doing, the degree of compression can be set by changing the counter holding force of the closure means for the compression chamber. The use of this ejection mechanism is limited to loose material that can be poured.

It is therefore an object of the present invention to provide a press of the aforementioned general type that has a shorter overall length, that to a large part can be handled or controlled remotely, and that during the compression process as well as during introduction of the pressed object into the transfer shaft, prevents any particles from escaping out of the press line, with this press nonetheless assuring that the unavoidable swelling of the pressed object in the axial direction will have no impact upon the removal of the counterpunch or the insertion of the transfer shaft.

BRIEF DESCRIPTION OF THE DRAWINGS

This object, and other objects and advantages of the present invention, will appear more clearly from the following specification in conjunction with the accompanying schematic drawings, in which:

FIG. 1 is a vertical cross-sectional view of one exemplary embodiment of the inventive press in which have been inserted extension rams and a counterpunch, and which contains a partially compressed object;

FIG. 2 is a plan view taken in the direction of arrow II in FIG. 1, with the cover portions partially removed;

FIG. 3 is an enlarged view of part of the press of FIG. 1 showing the counterpunch, the highly compressed pressed object, and a withdrawn press shaft;

FIG. 4 is an enlarged view of part of the press of FIG. 1 in which has been inserted the transfer shaft, into which has been introduced the highly compressed pressed object;

FIG. 5 is a view similar to FIG. 4, with the press shaft and the press ram retracted;

FIG. 6 is a cross-sectional view taken through the pres of FIG. 1 in the direction of the line VI—VI thereof;

FIG. 7 is an enlarged view of the portion VII in FIG. 1 showing the press shaft at the cylinder end;

FIG. 8 is a cross-sectional view through the press shaft taken in the direction of the line VIII—VIII in FIG. 1;

SUMMARY OF THE INVENTION

Figure 9:
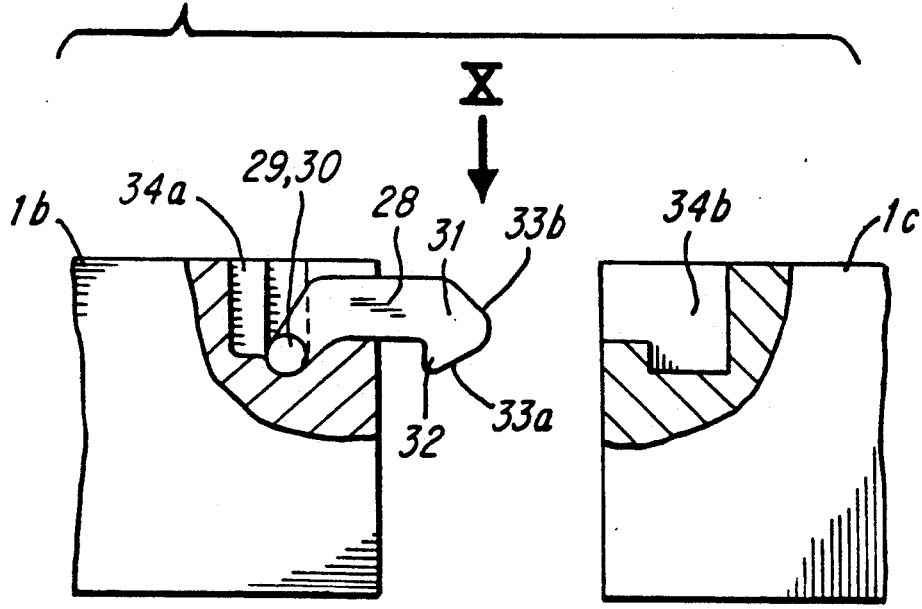
FIG. 9 is a partially cross-sectioned vertical view of the connection between two press ram sections in the region IX of FIG. 1 in a separated state.
Figure 10:
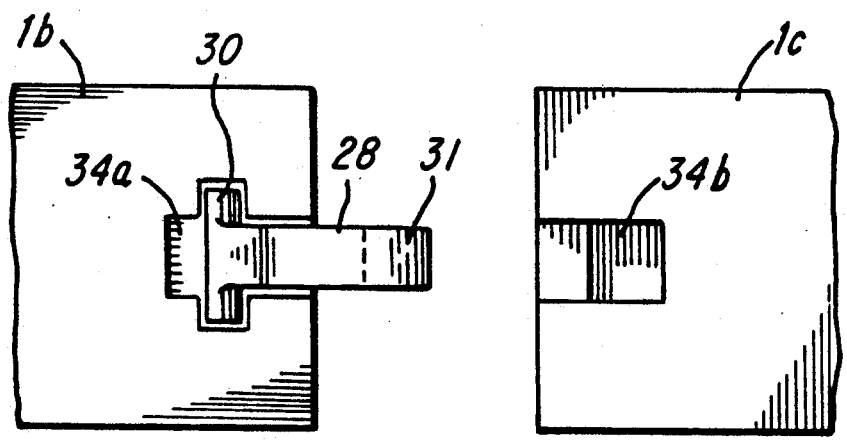
FIG. 10 is a view taken in the direction of the arrow X in FIG. 9.

The press of the present invention is characterized primarily in that: the press to a large extent comprises components that can be remotely handled, with the press ram being divided into several press ram sections and the cover being divided into several cover portions; a displacement drive mechanism is provided for the longitudinal displacement of the press shaft between parallel tie rods that interconnect two crosspieces, one for supporting the hydraulic cylinder, which is a short press cylinder, and the other, oppositely disposed crosspiece supporting whichever of the counterpunch and transfer shaft that is present; the press shaft, at an end thereof that is disposed in the pressing direction, is provided with: a horizontal support surface for whichever of the counterpunch and transfer shaft that is present, vertical abutment surfaces for bracing a pressing force at the counterpunch, vertical abutment surfaces of a stop of the press shaft to brace one of the cover portions in the pressing direction, and vertical abutment surfaces for end face engagement against the transfer shaft.

The advantages achieved with the present invention consist in the short overall length of the press, the good ability to remotely handle and conveniently remove the components, the compression process from which no particles can escape and which is achieved due to the longitudinal movability of the press shaft or line and the configuration of the counterpunch, and the non-restrained insertion and removal procedures for the counterpunch and for the transfer shaft.

To increase the service life of the press, it is proposed pursuant to one specific embodiment of the present invention that the press shaft be provided with a replaceable U-shaped, upwardly open wear insert, and that to improve the remote handling capability, the U-shaped wear insert of the press shaft be comprised of several wear insert sections that are successively disposed in the pressing direction, with that wear insert section that is the last or trailing one in the pressing direction be positively connected with the press shaft via holding strips, and that wear insert section that is first or leading in the pressing direction is disposed ahead of a remotely operable displacement drive means with which all of the wear insert sections are brought into engagement against on another in such a way that no gap exists therebetween and the last wear insert section is brought to rest against the holding strips at the base and side walls of the press shaft.

Also to increase the service life, in another specific embodiment of the present invention those surfaces of the cover sections that are directed toward the press shaft are provided with wear plates. In so doing, the cover section that is last or trailing in the pressing direction is positively connected with the wear plate via holding strips, and the first or leading cover section in the pressing direction is disposed ahead of a remotely operable displacement drive means with which prior to a pivoting and tightening of the cover bolts, all of the cover sections are brought to rest against one another in such a way that no gap exists between them, and the last section is brought to rest against the abutment surface of the stop of the press shaft. This prevents particles from becoming jammed between the sections, which could lead to increased wear of the press ram.

In order with little expenditure of time to be able to undertake a closing and opening of the cover sections, and in order for insertion of shorter already preshortened fuel cell skeletons or other structural elements not to have to open the entire cover, it is provided pursuant to a further specific embodiment of the present invention that the cover sections, independently of one another, be secured to the upper side of the press shaft via hook-like cover bolts that are pivotably secured in pairs in crossbars and positively engage in recesses on the side walls of the press shaft, and that the cover bolts in a remotely operated manner are pivoted in pairs into the engagement position and are subsequently tightened via nuts.

In order to keep the overall length of the press as short as possible, and in order to be able to reliably retract the press ram, which is divided into sections, out of the forward position, it is proposed pursuant to a further specific embodiment of the present invention that one or more extension rams be insertable between the cylinder ram, which is detachably secured to the piston rod of the press cylinder, and the guide ram, which rests against the material that is to be compressed, with these extension rams being positively interconnectable via connector pieces that can be placed in appropriate recesses.

In order to achieve an automatic coupling together of the various press rams, it is finally proposed pursuant to the present invention that that end of the connector pieces that faces the press cylinder be provided on both sides with pivot pins that are disposed transverse to the pressing direction, with the underside of the opposite end that is directed in the pressing direction being provided with a hook-like projection that is provided with an inclined leading surface, with the connector pieces positively engaging in appropriate recesses on the upper side of the extension rams and the guide ram.

Dividing the cover and the press ram into sections has the additional advantage that in order to compress short structural elements that do not have the length of the fuel cell skeleton, it is necessary to only partially open the cover, so that that cover section in the high compression region that is secured with a greater number of bolts can remain closed.

The method of operating the inventive press comprises the steps of: during a loading process and during the compression process, disposing the press shaft in a forward end position, with the abutment surfaces of the side walls of the press shaft for bracing a pressing force at the counterpunch resting against facing abutment surfaces of the counterpunch, which rests on the horizontal support surface of the press shaft and has a back side braced against the other crosspiece, whereby in this position of the counterpunch an extension thereof that is directed toward the press shaft extends into the interior of the press shaft by a given distance to close off the cross-sectional area of the press in a substantially gap-free manner; after conclusion of the compression process, moving the press shaft to a rear end position, whereby a first gap results between an end face of the extension of the counterpunch and the vertical abutment surfaces of the press shaft for end face engagement against the transfer shaft, and a second gap results between a abutment surface of the counterpunch and the abutment surfaces of the press shaft for bracing a pressing force at the counterpunch, with these gaps providing free spaces for a non-restrained removal of the counterpunch; after removal of the counterpunch, placing the transfer shaft on the horizontal support surface and advancing the press shaft to such an extent in the pressing direction until those vertical abutment surfaces for end face engagement against the transfer shaft and of the one cover portion that are disposed in a plane rest against the immediately facing abutment surface of the transfer shaft and the transfer shaft is subsequently braced against the other crosspiece; further advancing that press ram section that is most to the front in the pressing direction to introduce the highly compressed pressed object into the transfer shaft, whereby this press ram section extends into the transfer shaft by a prescribed distance; and withdrawing this press ram section to again retract the press shaft to the rear end position, whereby an adequate spacing results for a non-restrained removal of the transfer shaft.

Further specific features of the present invention will be described in detail subsequently.

DESCRIPTION OF PREFERRED EMBODIMENTS

Referring now to the drawings in detail, in the vertical cross-sectional view of the inventive power press illustrated in FIG. 1, the press shaft 3 is horizontally disposed on slide strips 13 of the transverse supports 12 of the mounting base 11 in such a way that the press shaft 3 can be longitudinally shifted in the direction of pressing. Secured to one end of the mounting base 11 is a crosspiece 6 against which the rear end of the press cylinder 5 is supported. At the opposite end of the mounting base 11, the crosspiece 8 is movable in the pressing direction. The crosspieces 6 and 8, as viewed in the pressing direction, are positively interconnected (see FIGS. 2 and 6) by two parallel tie rods 4 that are spaced from both sides of the press shaft 3; both ends of each tie rod 4 are provided with hammer heads 9.

At that end 3b disposed in the pressing direction, the press shaft 3 is provided with a horizontal support or surface 3c on which, in the operating positions of the press illustrated in FIGS. 1, 2, and 3, rests the counterpunch 7, the back end of which is supported on the crosspiece 8.

In the illustrated embodiment, the interior of the press shaft 3 is provided with an exchangeable or replaceable U-shaped wear insert 16 that is divided into sections 16a to 16f to facilitate removal thereof. The wear insert section that is disposed last in the pressing direction is positively connected with the press shaft 3 by holding strips 17 that are placed in grooves or notches. Via a displacement drive 18 (see FIG. 7) that acts in the pressing direction and that is supported on the press shaft 3, the wear insert sections 16a to 16f are brought to rest against one another with no gaps therebetween, and the wear insert section 16f is pushed against the holding strips 17.

The press shaft 3 is closed off by the cover portions 2a to 2c, the surfaces 19 of which that face the upper side 27 of the press shaft 3 each being provided in the illustrated embodiment with wear plates 20a to 20c. The cover portions 2a to 2c are secured with hook-like cover bolts 24 that are pivotably received in pairs in crossbars 38, and that engage or mesh with recesses 25 of the side walls 22 of the press shaft 3. Via a central control 26 (see FIG. 8), and a linkage disposed within the crossbar 38, the cover bolts 24 are remotely operated in pairs so as to pivot into or out of engagement with the recesses 25, with the cover bolts 24 subsequently being tightened via nuts 39. With regard to the cover portion 2c, in the region of high compression the crossbars 38 are spaced close together, whereas in the remaining compression region of the cover portions 2a and 2b, the crossbars 38 are spaced further apart.

The wear plate 20c is held fixedly in position on the cover portion 2c by the holding strip 36 to prevent shifting in the pressing direction.

Prior to final tightening of the hook-shaped cover bolts 24, the cover portions 2a to 2c are brought to rest against one another without a gap therebetween via the displacement drives 23 that act upon the free end face of the cover portion 2a and are supported on the press shaft 3, whereby the free end face of the cover portion 2c is supported at the vertical abutment surface 3f against the stop 21 of the press shaft 3.

The press ram, which is controlled by the press cylinder 5 via the piston rod 37, is divided into several press ram sections 1a to 1g, with the press ram section 1a (cylinder press ram) being connected to the free end of the piston rod 37 of the press cylinder 5 in such a wa that it is detachable via a plug connection and can be removed from above.

The press ram section 1g (guide ram) serves for direct engagement against the structural material that is to be compressed. In order to reach the full stroke of the press ram up to production of the highly compressed pressed object 15, extension rams 1b to 1f of equal length are disposed between the cylinder ram 1a and the guide ram 1g. The maximum stroke of the piston rod 37 of the press cylinder 5 is slightly greater than the length of one of the extension rams 1b to 1f. This assures adequate free space for the insertion of a respective extension ram.

The production of a highly compressed pressed object 15 is effected via the following steps:
  a) The empty press shaft 3 is moved to its rear end position, i.e. in the direction of the crosspiece 6, via the displacement drive 35, which is secured to the mounting base 11;
  b) After the counterpunch 7 is placed upon the horizontal support surface 3c, the press shaft 3 is moved by the displacement drive 35 in the direction toward the crosspiece 8 until the end faces 3d of the side walls 22 of the press shaft 3 abut against the abutment surfaces 7a that are disposed to the side on the counterpunch 7, and the counterpunch itself comes to rest against the crosspiece 8. In this position, the extension 10 of the counterpunch 7 extends by a specified distance T into the compression chamber;
  c) By means of the displacement drive means 18, the wear insert sections 16a to 16f are brought to rest against one another in such a way that no gap exists between them;
  d) The cylinder ram 1a and the directly abutting or engaging guide ram 1g are in their starting positions;
  e) After insertion of the fuel cell or element skeleton, the cover portions 2c, 2b, and 2a are placed on and are abutted against one another via the displacement drive 23, with the cover section 2c being brought to rest at the abutment surface 3f against the stop 21 of the press shaft 3. The hook-like cover bolts 24 that are pivotably mounted in the crossbars 38 are subsequently pivoted into the engagement position, and are tightened by activation of the nuts 39. The displacement drive means 23 is thereafter again moved into its starting position;
  f) After the first stroke of the press cylinder 5 has been effected to compress the fuel element skeleton, the piston rod 37, together with the cylinder ram 1a that is secured thereto, are retracted into the starting position. The cover 2a (loading cover) is removed after the tightening nut 39 have been loosened and the hook-like cover bolts 24 have been swung away;
  g) The extension ram 1f is disposed between the cylinder ram 1a and the guide ram 1g, which remains against the pressed object. As best shown in FIG. 9, a connector piece 28 is disposed in the recess 34a that is disposed on the upper side of the extension ram 1f. In particular, the connector piece 28 is pivotably mounted in the recess 34a via pivot pin means 29, 30 that extend to both sides transverse to the pressing direction. As the cylinder ram 1a is advanced, the bottom, inclined leading surface 33a of the connector piece 28 runs up on the bottom edge of the opening in the end of the recess 34b (in the guide ram 1g) until the hook-like projection 32 falls into the depression of the recess 34b, either due to the force of gravity or due to abutment by the inclined leading surface 33b that is on the upper side.
  h) The second stroke is subsequently effected and the cylinder ram 1a is again retracted into the starting position; the cover portion 2a (loading cover) can remain removed after the first stroke;

i) In a similar manner, the extension rams 1e, 1d, and 1c are successively inserted, and the respective compression strokes are carried out;

k) The last extension ram 1b that is to be inserted is additionally also connected to the cylinder ram 1a via a connector piece 28 in order after conclusion of the pressing process, and the still to be described ejection of the highly compressed pressed object 15, to be able to again retract the press ram sections 1b to 1f that are interconnected via connector pieces 28;

l) After achieving the greatest operating pressure of the press cylinder 5, i.e. after a prescribed pressing stroke has been achieved, the pressing process is considered completed; the press cylinder 5 is hydraulically relieved, and the press shaft 3 is moved to its end position in the direction of the crosspiece 6 via its displacement drive 35, whereby the counterpunch 7, with its extension 10, receives a free space E (see FIG. 3) for removal thereof. In so doing, the counterpunch 7 is held securely in place against the crosspiece 8 via non-illustrated stops;

m) After the counterpunch 7 has been removed, in place thereof a transfer or receiving shaft 14 is placed upon the support surface 3c. By means of the displacement drive 35, the press shaft 3 is advanced to such an extent in the direction toward the crosspiece 8 until those vertical abutment faces 3e, 3f of the press shaft 3 and cover portion 2c that are disposed in a plane rest against the immediate facing abutment surface 14a of the transfer shaft 14 and the latter is subsequently supported against the crosspiece 8;

n) By further advancing the press ram 1g (guide ram), the highly compressed pressed object 15 is shoved into the transfer shaft 14, whereby the guide ram 1g projects by a prescribed distance U into the transfer shaft 14 (see FIG. 4);

o) After retraction of the guide ram 1g, and after the press shaft 3 has been moved back in the direction toward the crosspiece 6, a sufficient distance V (see FIG. 5) results between the abutment faces 14a of the transfer shaft 14 and the abutment surfaces 3e, 3f of the press shaft for the non-restrained removal of the loaded transfer shaft;

p) After the transfer shaft 14 that is loaded with the highly compressed pressed object 15 has been removed, the extension rams 1b to 1f are removed in a sequence opposite to that in which they were inserted, whereby the cylinder ram 1a is always respectively coupled via the connector piece 28 to the immediately adjacent extension ram.

The counterpunch 7, the transfer shaft 14, the press ram sections 1a to 1g, the cover portions 2a-2c, the crossbars 38 with the cover bolts 24 that are pivotably mounted therein, as well as the U-shaped wear inserts 16a-16f, are provided with receiving openings to assure that they can be remotely handled via appropriate lifting mechanisms.

The present invention is, of course, in no way restricted to the specific disclosure of the specification and drawings, but also encompasses any modifications within the scope of the appended claims.

What we claim is:

1. In a press for compressing elongated radioactive structural elements, including a horizontally disposed press line that comprises a press shaft provided with a cover, a press ram operated via a hydraulic cylinder, and a removable counterpunch in place of which, after a compression process has been completed, is inserted a transfer shaft into which is introduced the highly compressed pressed object via further advancement of said press ram, the improvement wherein:

said press to a large extent comprises components that can be remotely handled, with said press ram being divided into several press ram sections and with said cover being divided into several cover portions;

a displacement drive mechanism is provided for the longitudinal displacement of said press shaft between parallel tie rods that interconnect two crosspieces, one for supporting said hydraulic cylinder, which is a short press cylinder, and the other, oppositely disposed crosspiece supporting whichever of said counterpunch and said transfer shaft that is present; and said press shaft, at an end thereof that is disposed in the pressing direction, is provided with: a horizontal support surface for whichever of said counterpunch and said transfer shaft that is present, first vertical abutment surfaces for bracing a pressing force at said counterpunch, second vertical abutment surfaces of a stop of said press shaft to brace one of said cover portions in the pressing direction, and third vertical abutment surfaces for end face engagement against said transfer shaft.

2. A press according to claim 1, in which said press shaft has an interior that is provided with a replaceable, U-shaped, upwardly open wear insert means.

3. A press according to claim 2, in which said wear insert means of said press shaft comprises several wear insert sections that are disposed one after the other in the pressing direction, whereby the leading wear insert section, as viewed in the pressing direction, is positively connected with said press shaft via holding strip means, and whereby the trailing wear insert section, in the pressing direction, is disposed ahead of a remotely controllable displacement drive means that is adapted to bring all of said wear insert sections into engagement against one another in such a way that there are no gaps between them, and is also adapted to bring said leading wear insert section into engagement against said holding strip means on a base and inner walls of said press shaft.

4. A press according to claim 1, in which said cover portions have surfaces that face said press shaft and that are provided with wear plate means, whereby the leading cover portion as viewed in the pressing direction, is positively connected with pertaining wear plate means via holding strip means.

5. A press according to claim 4, in which the trailing cover portion, in the pressing direction, is disposed ahead of a remotely controllable displacement drive means that, prior to a tightening of said cover portions via cover bolts, is adapted to bring all of said cover portions into engagement against one another in such a way that there are no gaps between them, and is also adapted to bring said leading cover portion into engagement against said third abutment surface of said stop on said press shaft.

6. A press according to claim 1 in which said cover portions, independently of one another, are secured against an upper side of said press shaft via hook-like cover bolts that are pivotably mounted, in pairs, in crossbars, and that positively engage in recess means disposed on the outside of side walls of said press shaft;

which includes central control means for remotely pivoting said cover bolts, in pairs, into an engagement position; and which includes nuts for tightening said cover bolts.

7. A press according to claim 1, in which said press cylinder is provided with a piston rod, and said press ram sections include, as viewed in the pressing direction, a trailing cylinder ram that is detachably secured to said piston rod, a leading guide ram for engagement against material that is to be compressed, and between said cylinder ram and said guide ram at least one extension ram, with said press ram sections being provided with recess means for receiving connector pieces for positively interconnecting same.

8. A press according to claim 7, in which each of said connector pieces has two ends, one of which is directed toward said press cylinder and is provided on two sides with pivot pin means that extends transverse to the pressing direction, and the other oppositely disposed end is directed in the pressing direction and has an underside that is provided with a hook-like projection that has an inclined leading surface; and in which said recess means for positively receiving said connector pieces are disposed in upper surfaces of said cylinder ram, said extension rams, and said guide ram.

* * * * *